United States Patent [19]

Huber

[11] Patent Number: 5,024,172
[45] Date of Patent: Jun. 18, 1991

[54] PLANT SEEDLING HOLDING AND DISPENSING MECHANISM

[75] Inventor: Ernst Huber, Prince George, Canada

[73] Assignees: J.E. Love Company, Garfield, Wash.; Agro Forest Technik North America, Inc., Prince George, Canada; a part interest

[21] Appl. No.: 520,242

[22] Filed: May 7, 1990

[51] Int. Cl.$^5$ .................. A01C 11/02; A01C 11/00
[52] U.S. Cl. .................................. 111/104; 111/117
[58] Field of Search ................ 111/100, 104, 14, 109, 111/105, 111, 117

[56] References Cited

U.S. PATENT DOCUMENTS

| | | | |
|---|---|---|---|
| 1,765,469 | 6/1930 | Vollink | 111/100 |
| 2,651,405 | 9/1953 | McGowan | 111/100 |
| 2,669,920 | 2/1954 | Valle . | |
| 2,739,548 | 3/1956 | Poll | 111/111 |
| 2,959,141 | 11/1960 | Wilson | 111/100 |
| 3,094,082 | 6/1963 | Wilson | 111/111 |
| 3,125,044 | 3/1964 | Kolk | 111/100 |
| 3,176,635 | 4/1965 | Mabon . | |
| 3,643,611 | 2/1972 | Owens et al. . | |
| 3,899,985 | 8/1975 | Rath . | |
| 3,921,548 | 11/1975 | Alkemade . | |
| 3,931,774 | 1/1976 | Bradley . | |
| 3,972,294 | 8/1976 | Grundstrom et al. . | |
| 4,112,857 | 9/1978 | Bradley . | |
| 4,344,374 | 8/1982 | Gangluff et al. . | |
| 4,408,550 | 10/1983 | Ellis | 111/111 |
| 4,438,710 | 3/1984 | Paladino . | |
| 4,788,920 | 12/1988 | Shaw . | |

FOREIGN PATENT DOCUMENTS 0062917  4/1982  European Pat. Off. .

Primary Examiner—Dennis L. Taylor
Assistant Examiner—Spencer Warnick
Attorney, Agent, or Firm—Wells, St. John & Roberts

[57] ABSTRACT

A seedling holding and dispensing mechanism used on planters having a planting arm which is intermittently extended downwardly into the soil. The seedling holder and dispenser is preferably mounted along the trailing edge of the planting arm. The seedling holder includes a first jaw and a second jaw. The first jaw is preferably mounted to the trailing edge of the planting arm in a fixed position. The second jaw is mounted for movement relative to the first jaw to allow clamping of the seedlings. The second jaw can be pivotally mounted, such as by using a connecting rod which is pivoted torsionally about a longitudinal axis. A proximate end of the connecting rod is adapted to have a lever arm. The mechanism preferably uses retraction and extension position actuators which automatically open the jaws in both the retracted loading position and the extended discharging position. A biasing spring biases the jaws together when not actuated to thereby hold the seedling as it is moved downwardly and inserted into the soil.

14 Claims, 6 Drawing Sheets

Fig. II

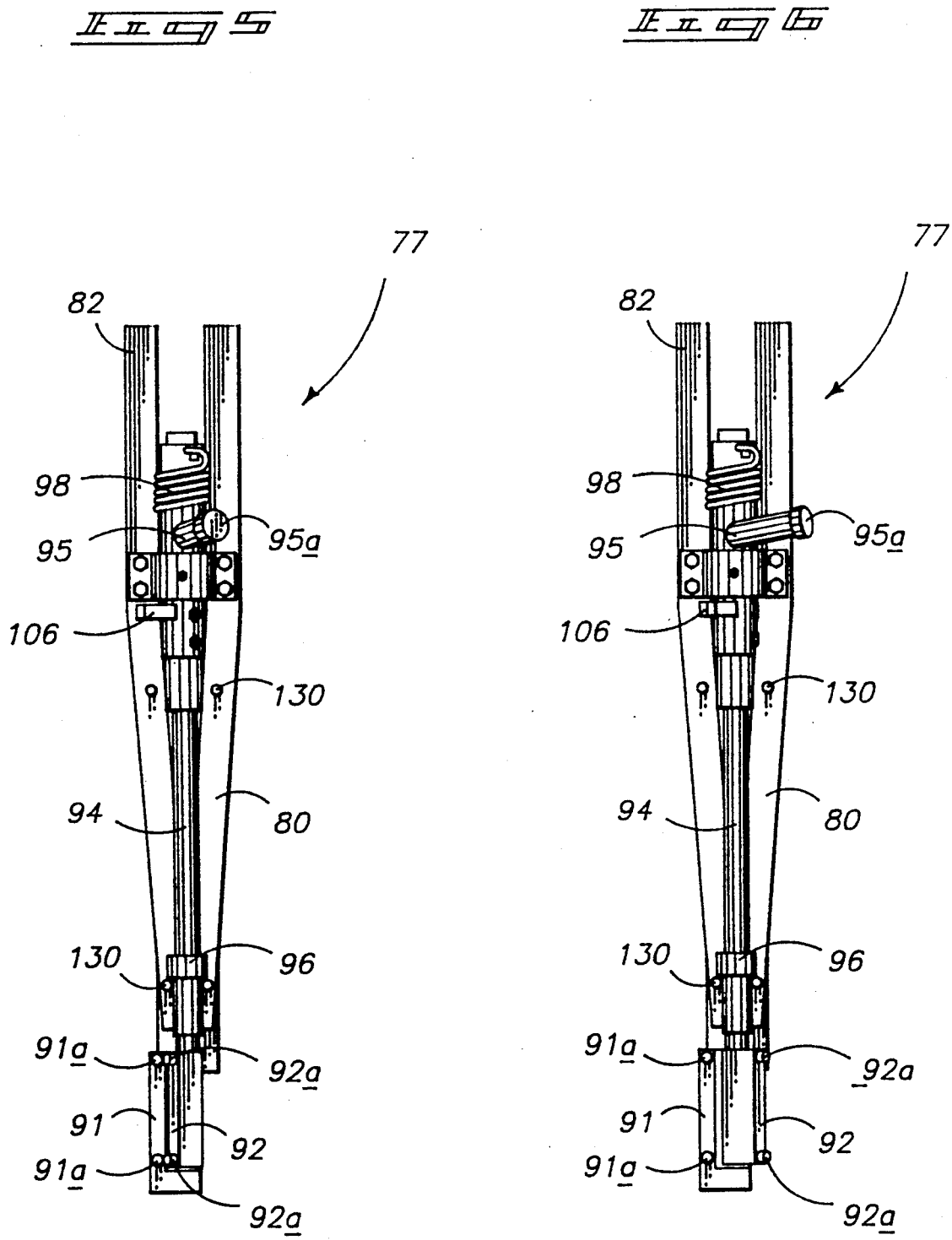

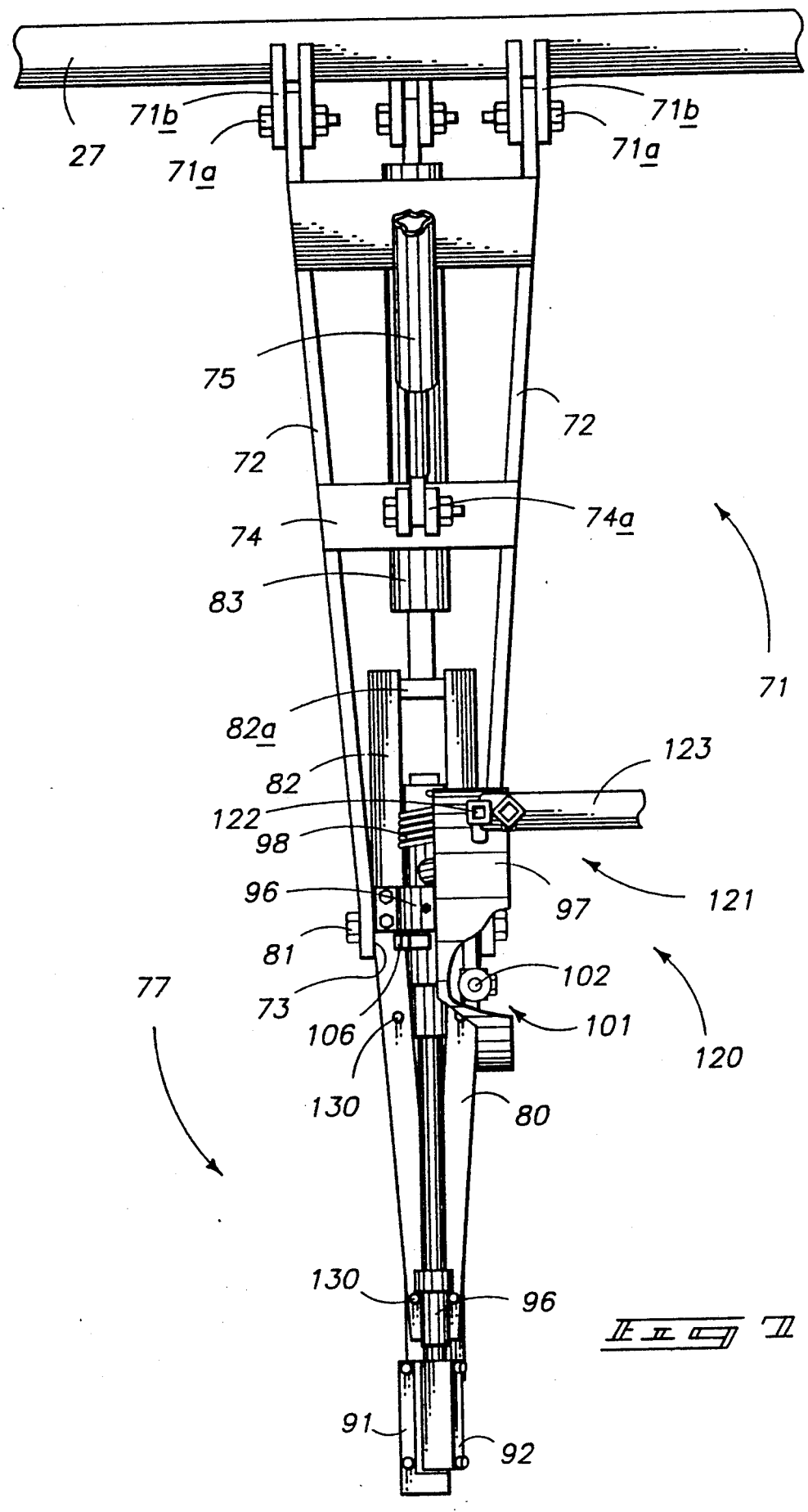

PLANT SEEDLING HOLDING AND DISPENSING MECHANISM

TECHNICAL FIELD

The technical field of this invention is plant seedling holding and dispensing mechanisms.

BACKGROUND OF THE INVENTION

The widespread harvesting of timber has increased the need for improved re-forestation practices. Most re-forestation planting is done in areas previously logged. It is common for re-forestation planting to be accomplished by manual labor, but such an approach is costly. The high cost of manual planting is caused by the difficulty of the work, the large amounts of area which must be covered, and the large volume of tree seedlings which must be planted. There have been numerous attemps to design a suitable tree seedling planter which is effective and efficient. To date all mechanized tree seedling planters have suffered from one or more limitations which have deterred acceptance of these implements by the lumber industry.

Of particular significance to this invention are problems experienced in prior art seedling holders and dispensers. The seedling holder is subjected to severe service since it must hold the seedling and appropriately release the seedling as it is placed into the ground. Correct placement of the seedling within the soil layer is one of the most important factors in seedling survival. The seedling must be properly held and appropriately released to achieve acceptable position and orientation within the ground.

The insertion and removal of mechanized seedling holders has previously caused substantial maintenance and operational problems. The seedling holder operates in the soil under conditions of moisture and a variety of soil compositions. Some soils are highly abrasive, while others are gummy and sticky. Nearly all are likely to contain sufficient amounts of organic matter or other constituents which can cause fouling or plugging.

Prior art seedling holders have typically functioned to eject a seedling by using a linear ejection mechanism. Such mechanisms often entail bulky and relatively heavy mechanisms. Use of such heavy mechanisms on a movable planting arm can significantly reduce the speed of operation because of the larger mass which must be repeatedly accelerated and decelerated during cycling of the planting arm. Accordingly there is a need for minimizing the mass and inertia associated with a seedling holding and planting apparatus.

Another deficiency of the prior art is the efficient and automatic operation of the seedling holder into open positions at both the loading and unloading positions. Prior art seedling holders such as shown in U.S. Pat. No. 3,899,985 to Rath are only capable of manual loading, thus requiring manipulation of an operator handle to load a seedling into the seedling holder. Although the Rath patent shows release of the seedling holder in the extended position, the absence of automatic opening in the retracted loading position creates a very significant amount of delay and greatly reduces the rate of speed at which seedlings can be planted.

Until the present invention there has remained a strong need in the art for an efficient, reliable, and automatic seedling holder and dispensing mechanism for use in planting seedlings, particularly tree seedlings.

BRIEF DESCRIPTION OF THE DRAWINGS

One or more preferred embodiments of the invention are illustrated in the accompanying drawings, which are briefly described below.

FIG. 5 is a partial plan view showing the seedling holder and dispenser of FIG. 1 in a closed clamping position.

FIG. 6 is a view similar to FIG. 5 showing the seedling holder of FIG. 1 in an open unclamped position.

FIG. 7 is a top view of the seedling holder and dispenser as shown in FIG. 1.

DETAILED DESCRIPTION OF THE PREFERRED EMBODIMENTS

This disclosure of the invention is submitted in furtherance of the constitutional purposes of the Patent Laws "to promote the progress of science and useful arts" (Article 1, Section 8).

Figure 1:
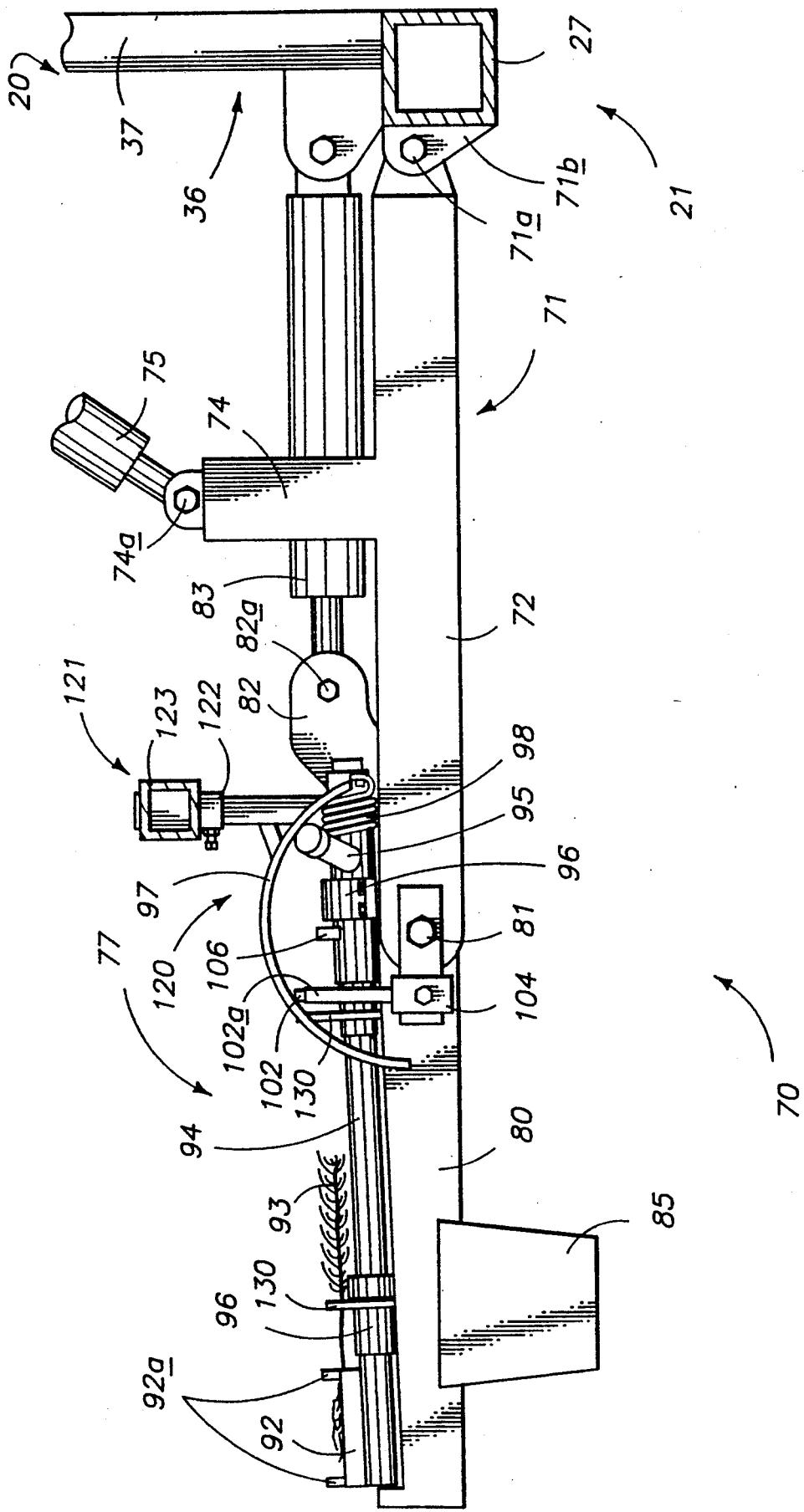
FIG. 1 is a side elevational view showing a portion of a seedling planter which incorporates a novel seedling holder and dispenser according to this invention. The seedling holder and dispenser is shown in a first operational position.

FIG. 1 shows portions of a preferred tree seedling planter 20. Planter 20 is adapted for connection behind a tractor (not shown) or other suitable pulling vehicle. Seedling planter 20 is provided with a frame 21 which is the fundamental structural assembly of the implement. Frame 21 is connected to the hitch (not shown). Frame 21 preferably includes a front transverse member 27. The seedling planter frame 21 also preferably includes a frame superstructure 36. The superstructure advantageously includes posts 37 which extend upwardly from the front transverse member 27.

Seedling planter 20 includes a preferred seedling holding and dispensing apparatus 77 in accordance with this invention. Portions of the seedling holding and dispensing apparatus 77 are provided in a planting subassembly 70. The seedling holding and dispensing apparatus opens to receive a seedling 93, holds the seedling, repositions the seedling downwardly into the soil, and dispenses the seedling into a short furrow cut in the soil by the planting arm 80.

Planting subassembly 70 is preferably connected to the main frame 21 at or near a central frontward position. The first planting assembly piece or link 71 is mounted to allow vertical movement relative to the frame, such as at pivotal mounting 71a near the forward end of piece 71 with frame 21. As shown, the first planting assembly link 71 is pivotally mounted to the front transverse member 27 using mounting tabs 71b which are welded thereto. The first piece 71 is advantageously formed as a welded assembly in a generally A-shaped configuration when viewed in the horizontal plane (see FIG. 7). The wide end of the A-shaped structure is pivotally connected to the frame towards the front, and the narrow or apex end of the A-shape extends rearwardly. The A-shaped first planting assembly piece 71, or A-frame, is advantageously formed of two side bars 72 joined at intermediate points with the apex forming a slotted yoke 73 for pivotally mounting a second planting assembly piece or link hereinafter referred to as planting arm 80. Planting arm 80 is connected to the first planting assembly piece 71 using planting arm pivot pin 81.

The first planting assembly link 71 also preferably includes an actuator connection which is advantageously provided in the form of a transverse extension bar 74. The actuator extension 74 is an upwardly and transversely extending bar connected to both side bars 72. The bar is provided with a pivot connection 74a. The actuator extension 74 provides a pivotal connection between the first planting assembly link 71 and a first planting assembly piece actuator 75. The actuator 75 is preferably a fluid powered extendible and contractible ram, such as a hydraulic ram assembly. The ram actuator 75 angles upwardly from the pivotal connection with the extension 74 and is pivotally mounted to the frame at a suitable location. The actuator 75 and pivot 74a are centrally located along an approximate longitudinal axis of both the A-shaped piece 71 and the longitudinal axis of the seedling planter 20. The first planting assembly piece actuator is used to move portions of the first planting assembly piece 71 downwardly and upwardly by extending or contracting the ram 75.

Planting arm 80 preferably forms a portion of the seedling holding and dispensing apparatus 77. Planting arm 80 is advantageously formed as an elongated bar or assembly of two bars adapted for pivotal connection at the planting arm pivot axis defined by pivot pin 81. Planting arm 80 is further provided with an upper offset end 82 which is advantageously formed as a connection yoke with a pivot pin 82a spanning across the yoke. The yoke so formed also receives the rearward end of a planting arm actuator 83.

Figure 3:
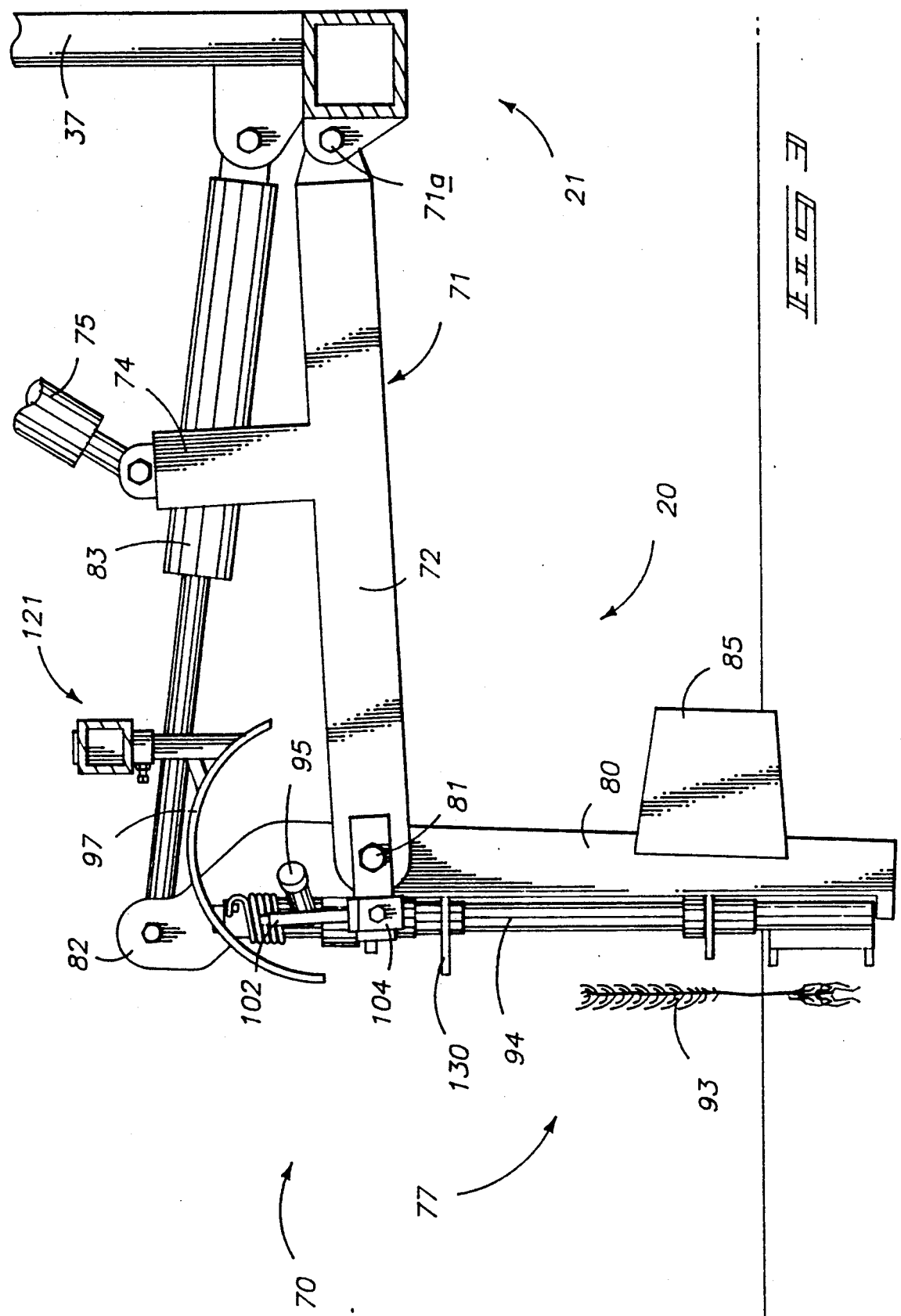
FIG. 3 is a side elevational view similar to FIG. 1 with the seedling holder and dispenser shown in a third operational position.

Planting arm actuator 83 is preferably an extendible and contractible link, such as in the form of a fluid powered ram, for example a hydraulic ram. The opposite forward end of the planting arm ram 83 is pivotally connected to the frame in any suitable manner. Contraction of the planting arm actuation ram 83 causes the planting arm to assume a longitudinal, approximately horizontal, loading position, as shown in FIG. 1. Extension of the ram 83 causes the planting arm to rotate counterclockwise to obtain a downwardly extending, approximately vertical, planting position, such as shown in FIG. 3.

The planting arm functions to extend into the soil and cut a short furrow in which the seedling is planted. To aid in this furrow cutting function the planting arm is advantageously provided with a debris clearing attachment or blade 85 upon the forward or cutting edge of the planting arm. The debris blade 85 can be formed by two pieces of metal plate welded together and to the sides of the planting arm.

Other components of the seedling holding and dispensing apparatus 77 are also mounted upon the rearward or trailing edge of the planting arm 80. The seedling holder preferably includes a pair of jaws 91 and 92 which are controlled between open and closed positions. In the open position the first jaw 91 and the second jaw 92 are spaced apart to receive a seedling 93 which is manually placed therein by a human operator. The first jaw 91 is mounted on the planting arm in a stationary position, whereas the second jaw 92 is movably mounted to the planting arm. As shown, the second movable jaw 92 is mounted via connection to a movable seedling holder actuation member or rod 94. The seedling holder actuation rod 94 is moved to operate the jaws between the open and closed positions.

Jaws 91 and 92 are advantageously formed by jaw pieces which are suitably shaped to receive and hold the seedling therebetween. The jaw pieces can be constructed in a form providing substantially planar opposed interior jaw faces which are moved to contract towards each other to form a captivation chamber in which the seedling root portion is typically held. The jaw faces are preferably spaced apart inwardly and oriented to converge toward their distal edges. Contact prongs 91a and 92a are advantageously provided to maintain spaced relationship along the distal edges of the jaw faces to thereby reduce the potential for injury to the seedling roots during clamping.

Seedling holder and dispenser 77 includes jaw connection member 94. Member 94 can be mounted to the trailing edge of the planting arm 80 in a variety of suitable constructions. As shown the member or rod 94 is rotatably held by a pair of journal bearings 96. The journal bearings can be provided with grease fittings. A rotation stop mechanism 106 is advantageously included on the rod 94, preferably at a fixed angular position using set screws or other suitable retainer. The stop mechanism includes a stop arm which extends outwardly from the rotatable shaft to engage the planting arm and limit the clamping force applied by the jaws 91 and 92.

The connection rod 94 is pivotable about a longitudinal axis in response to force applied by one or more jaw operators. Force is preferably applied via a connection member lever arm 95. Lever arm 95 extends outwardly in a transverse orientation from the longitudinal axis of the rod to allow torsional rotation about such axis. The end of lever arm 95 can be provided with a rotatable cam follower 95a (FIG. 5).

The invention further includes a retraction position jaw operator 120 for automatically actuating the jaws into an open position when the planting arm is retracted as shown in FIG. 1. The retraction position operator advantageously operates the movable jaw 92 via the connection member rod 94. Engagement between the connection member and the retraction position operator is advantageously effectuated using lever arm 95. The lever arm engages against a cam 97 forming portions of operator 120. The lever arm engages the cam when the planting arm and first planting member 71 are retracted upwardly. The lever arm 95 engages cam 97 to rotate rod 94 and move jaw 92 to thereby open the jaws. The cam follower bears upon the downward or other camming surface of the cam 97. The concave camming surface is advantageously shaped to allow engagement of the cam follower thereagainst at an oblique or tangential angle to reduce acceleration forces and shock.

The retraction position jaw operator is preferably mounted to the seedling planter frame using an adjustable mount 121. The adjustable mount includes a vertical extension adjustment 122 and a horizontal adjustment 123. The adjustable mount allows the position of cam 97 to be adjusted relative to the lever arm 95 which engages the camming surface.

The invention also includes an extension position jaw operator 101 for automatically operating the jaws into an open position for releasing and dispensing the seedling when the planting arm is in an extended position. The extension position jaw operator 101 advantageously includes a lever arm actuator 102 which is contacted by the lever arm 95 when the planting arm is moved into the downward planting position of FIG. 3. The lever arm actuator 102 is mounted to the planting assembly first piece 71, preferably using an adjustable mounting bracket 104. The lever arm actuator 102 includes a central shaft which mounts an outer rotatable sleeve 102a which rolls during contact with the lever arm 95.

The movable jaw is preferably biased, such as into the clamping position. As shown this is accomplished using a torsional force biasing spring 98. The spring 98 is connected between the planting arm 80 and a detachable collar mounted on the rod 94. The rod is thus rotated to close the second jaw 92 against the first jaw 91 except when the jaw is actuated open at the retracted and extended positions. This causes a seedling placed between the jaws to be held on a downward stroke. The seedling is released when the planting arm is fully extended and the lever arm 95 is forced by engagement with actuator 102 as shown in FIG. 3.

The trailing edge of the planting arm is also preferably provided with one or more sets of seedling guides 130 which help to laterally position the seedling during manual loading and mechanized planting.

Figure 2:
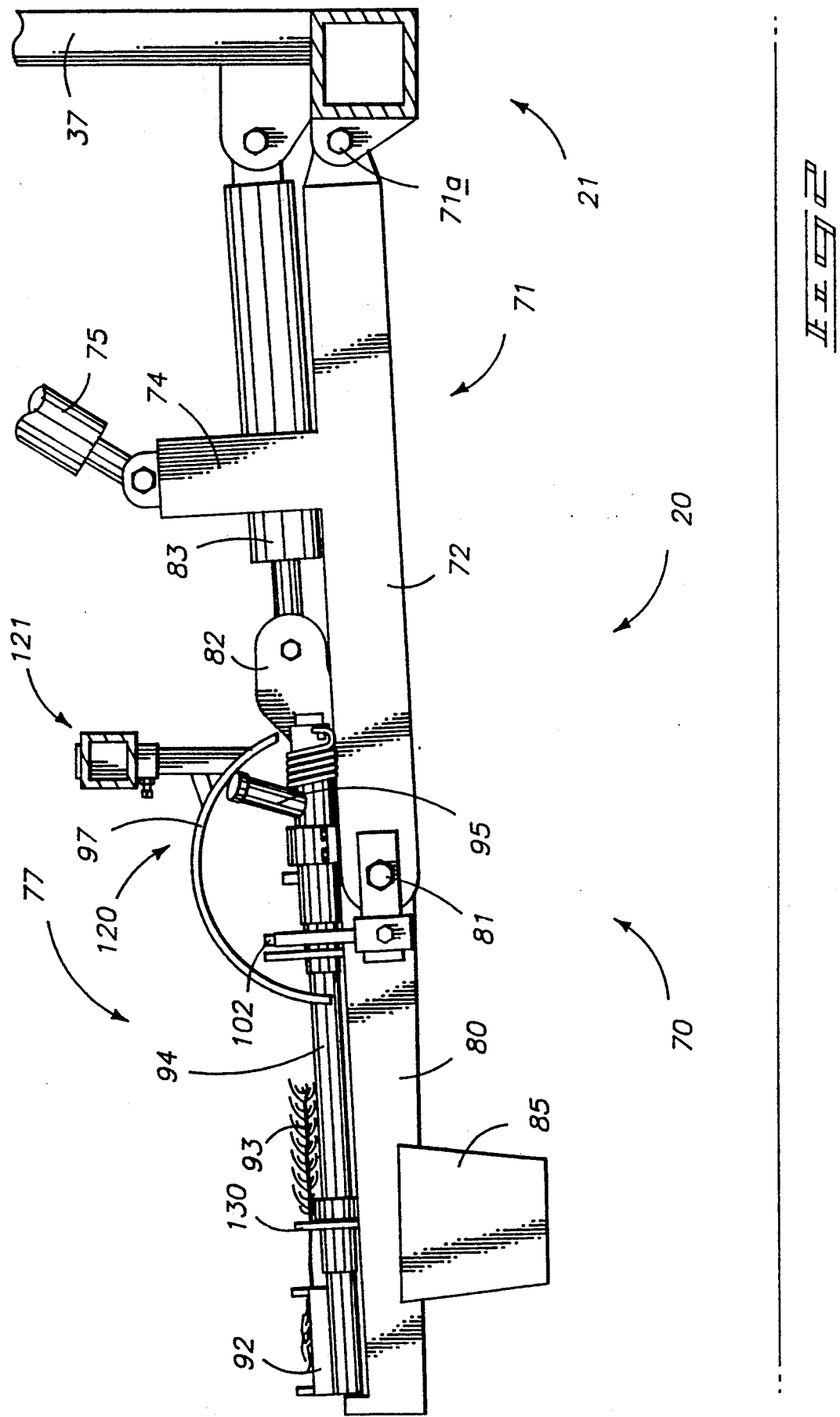
FIG. 2 is a side elevational view similar to FIG. 1 with the seedling holder and dispenser shown in a second operational position.

FIGS. 1-4 show an operational sequence of the seedling holding and dispensing apparatus 77. FIG. 1 shows the fully retracted position. A seedling 93 is manually placed with the root portion within the jaws 91 and 92 and the upper portions of the plant aligned along the trailing edge of the planting arm, such as within the guides 130. Initial action of the planting assembling is caused by extension of the first piece actuating ram 75. Extension of ram 75 causes the planting assembly first piece 71 to rotate downwardly, such as shown in FIG. 2. The extent to which the first piece 71 is extended is preferably controlled in a manner which is variable to accommodate varying heights of the planting arm relative to the terrain. The downward extension of the first piece 71 causes partial to full closure of the clamping jaws as the longitudinal pivot axis moves away from the camming surface thus allowing the lever arm 95 and attached shaft 94 to rotate.

After the first piece 71 is extended to the desired degree, then the planting arm 80 is rotated about the pivot pin 81 by extending the planting arm actuation ram 83. FIG. 3 shows the planting arm fully extended into a planting position. In this position the lever arm 95 engages the extended position actuator 102, thus causing the rod 94 to be rotated. The second jaw 92 is connected to rod 94 and is moved into an open position relative to first jaw 91. The opening of the jaws thus causes seedling 93, previously held within the jaws, to be released into the short furrow formed by the planting arm 80. The seedling is packed into position by the action of packing wheels (not shown).

Figure 4:
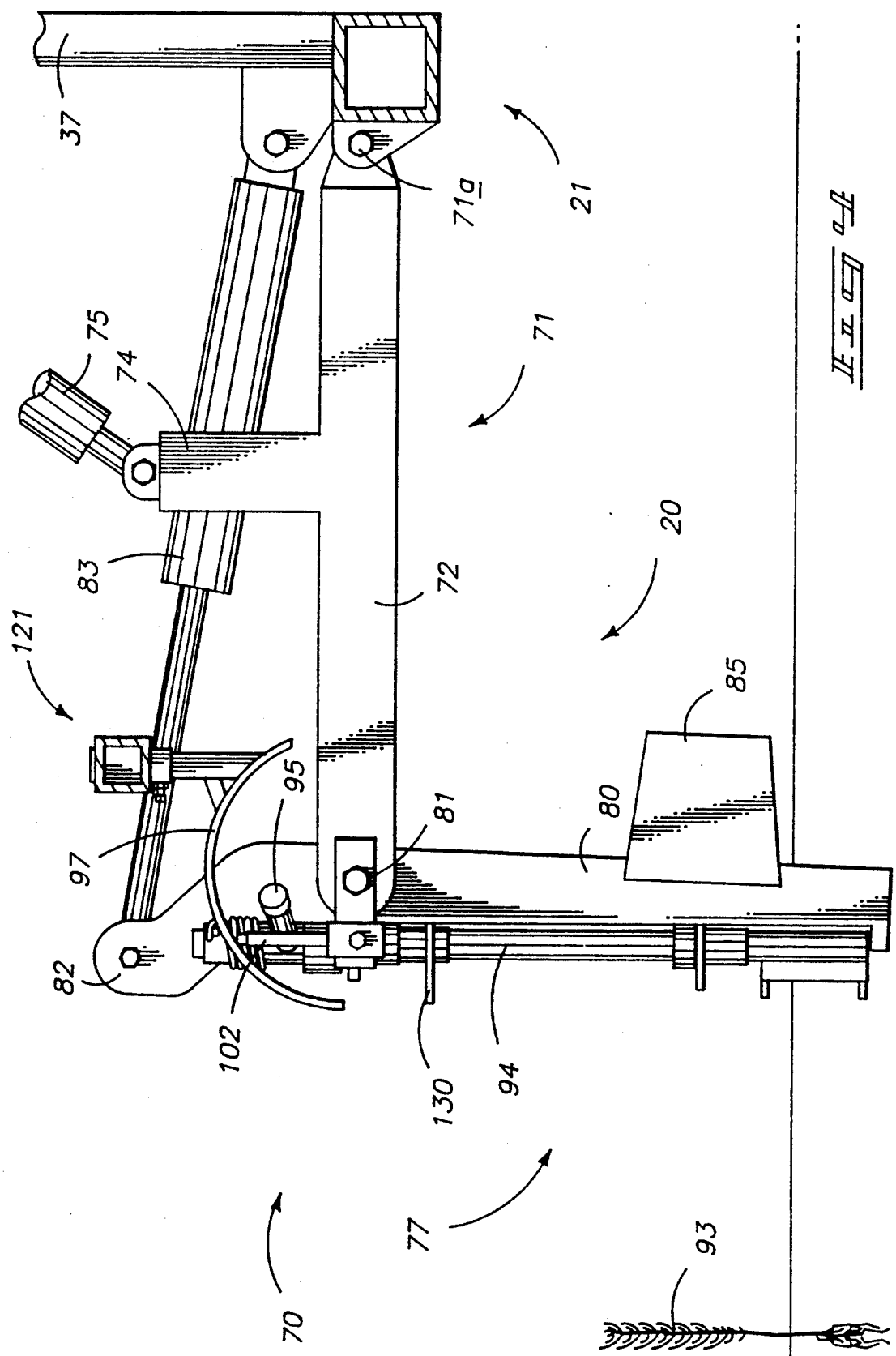
FIG. 4 is a side elevational view similar to FIG. 1 with the seedling holder and dispenser shown in a fourth operational position.

FIG. 4 shows the planting subassembly partially retracted. First piece 71 is retracted as a result of contraction of the first piece actuating ram 75. The planting arm actuating ram 83 is thereafter contracted to retract the planting arm 80 to thus achieve the strating position shown in FIG. 1. The jaws 91 and 92 are automatically opened upon retraction of the planting arm due to the engagement of the cam follower against the camming surface of cam member 97. The seedling holder and dispenser is thus ready and open for manual loading of another seedling 93 into the clamping jaws.

The seedling holding and dispensing apparatus according to this invention can be made according to well-known metal working techniques using steel or other suitable materials of construction.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

biasing means connected to bias said movable jaw to achieve clamping between said first and second jaws to hold a seedling therebetween.

2. A seedling holder according to claim 1 and further comprising at least one seedling guide connected to the planting arm for laterally restraining a seedling positioned between the first and second jaws.

3. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

a jaw connection member connected to said movable jaw; said at least one retraction position jaw operator and said at least one extension position jaw operator being constructed to engage the jaw connection member to effectuate movement of said movable jaw.

4. A seedling holder and dispenser according to claim 3 and further comprising a jaw connection member lever arm connected to said jaw connection member; and wherein said at least one retraction position operator includes a retraction position actuator which is engaged by said jaw connection member lever arm when the planting arm is in a retracted position.

5. A seedling holder and dispenser according to claim 3 and further comprising a jaw connection member lever arm connected to said jaw connection member; and wherein said at least one extension jaw operator includes an extension position actuator which is engaged by said jaw connection member lever arm when the planting arm is in an extended position.

6. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one retraction position jaw operator and the extension position jaw operator are adjustably mounted.

7. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one retraction position jaw operator is adjustably mounted.

8. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one retraction position jaw operator is a cam member.

9. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one retraction position jaw operator is a cam member having a concave camming surface.

10. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one retraction position jaw operator is an adjustably mounted cam member having a concave camming surface.

11. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one extension position jaw operator is adjustably mounted.

12. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one extension position jaw operator includes a shaft.

13. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one extension position jaw operator includes a shaft which mounts a rotatable sleeve.

14. A seedling holder and dispenser for use in a seedling planter to hold a seedling during insertion of the seedling into the soil and to release the seedling when the seedling has been appropriately placed into the soil, comprising:

a planting arm having a distal end mounted for controlled extension into soil and retraction from soil; the planting arm having a leading edge which pierces the soil when the planting arm is extended for planting, and a trailing edge which is opposite to said leading edge;

at least first and second jaws connected to the planting arm in relative juxtaposition; at least one of said first and second jaws being a movable jaw which is movably connected to the planting arm to allow controlled clamping of a seedling between said first and second jaws;

at least one retraction position jaw operator for automatically operating said first and second jaws into an open loading position suitable for loading a seedling therebetween when the planting arm is in a retracted position;

at least one extension position jaw operator for automatically operating said first and second jaws into an open releasing position suitable for releasing a seedling from said first and second jaws when the planting arm is in an extended position; said at least one extension position jaw operator having components thereof different from said at least one retraction position jaw operator;

wherein the at least one extension position jaw operator is adjustably mounted and includes a shaft which mounts a rotatable sleeve.

* * * * *